United States Patent
Natan et al.

(10) Patent No.: US 6,205,546 B1
(45) Date of Patent: Mar. 20, 2001

(54) COMPUTER SYSTEM HAVING A MULTI-POINTER BRANCH INSTRUCTION AND METHOD

(75) Inventors: Rami Natan, Ramat Gan; Arie Ben-Ephraim, Herzlia; Arie Kazachin, Rishon Lezion; Alex Miretsky, Haifa; Vitaly Sukonik, Hadera, all of (IL)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/273,386

(22) Filed: Mar. 22, 1999

(30) Foreign Application Priority Data

Mar. 27, 1998 (EP) .................................................. 98105605

(51) Int. Cl.[7] .................................................. G06F 12/00
(52) U.S. Cl. .......................................... 712/238; 712/226
(58) Field of Search ...................................... 712/226, 238

(56) References Cited

U.S. PATENT DOCUMENTS

| | | | |
|---|---|---|---|
| 4,905,141 | * | 2/1990 | Brenza .................................. 711/129 |
| 5,632,024 | | 5/1997 | Yajima et al. ........................ 395/381 |
| 5,784,605 | * | 7/1998 | Ando .................................... 712/238 |
| 6,021,272 | * | 2/2000 | Cahill .......................................... 717/5 |
| 6,044,450 | * | 3/2000 | Tsushima .............................. 712/24 |
| 6,108,773 | * | 8/2000 | Col ...................................... 712/237 |
| 6,119,222 | * | 9/2000 | Shiell .................................... 712/238 |

OTHER PUBLICATIONS

Wolfe et al, "Executing compressed programs on an embedded RISC architecture" 25th annual international symposium on microarchitecture. Micro 25, Portland, Or. Usa, Dec. 1–4, 1992, vol. 23, No. 1–2, pp. 81–91.

Breternitz M JR et al, "Enhanced compression techniques to simplify program decompression and execution", Proceedings. International Conference on Computer Design. VLSI in Computers and Processors(Cat. No. 97CB36149), Proceedings International conference on computer design VLSI in computers and processors, Austin, TX, USA, Oct. 12–15, 1997, pp. 170–176.

* cited by examiner

Primary Examiner—Eric Coleman

(57) ABSTRACT

A computer and a method are described having multiple pointers for a branch instruction. A branch target instruction called by the branch instruction is divided into H parts locatable by K pointers. L of the K pointers are stored in the branch instruction and K-L pointers are stored with the H parts of the branch target instruction. A tag identifies a variable boundary between first and second halves of the memory, word by word. The first half of the memory space contains V of H parts of the instructions and the second half of the memory space contains the H-V parts. The parts in the first and second halves of the memory space are compressed and decompressed in parallel.

10 Claims, 5 Drawing Sheets

COMPUTER SYSTEM HAVING A MULTI-POINTER BRANCH INSTRUCTION AND METHOD

RELATED INVENTIONS

A commonly assigned patent application Ser. No. 09/273,369, entitled "Computer System Having a Single Pointer Branch Instruction and Method", Attorney Docket Number SC0146WI, by Arie BEN-EPHRAIM et al., filed concurrently herewith is related.

FIELD OF THE INVENTION

This invention concerns a computer using a multi-pointer branch instruction and operating and memory organization method therefore.

BACKGROUND OF THE INVENTION

Computer instructions are generally stored in a memory coupled to the central processor (CPU) of a computer system. Some instructions involve branching. Branching can be conditional or unconditional.

A branch target instruction is the instruction that is fetched by the processor (CPU) when executing a branch instruction. Usually, during the execution of a branch instruction, the CPU outputs the address of the branch target instruction to instruction memory. This address is known as the "branch target address" and is a part of any branch instruction. The size of each instruction can vary for various reasons, including using compression coding. Pointers are employed to point to the locations in memory where various parts of instructions are stored. It is often the case that parts of an instruction are stored at different locations in memory necessitating the use of multiple pointers to locate the various parts.

When there is a need to branch to a branch target instruction, there is a need to know all the pointers of the branch target instruction. Storing all the pointers of the branch target instruction within a branch instruction can cause several problems. For example, it can make the branch instruction very long, and require more than one read cycle in order to read and process it. Also, a long branch instruction allows very few bits for pointers, so that there is very limited branching space.

Thus, there is an ongoing need for improved computers and computer memory organization and operating methods which reduce or eliminate these and other well known limitations of the prior art in employing or implementing branching instructions.

DETAILED DESCRIPTION OF THE DRAWINGS

An advantage of the present invention is that it provides a structure and method wherein the computer system memory is more effectively used and instructions can be more rapidly compressed and decompressed to reduce the required storage space or allow a larger branching space or both.

Figure 1:
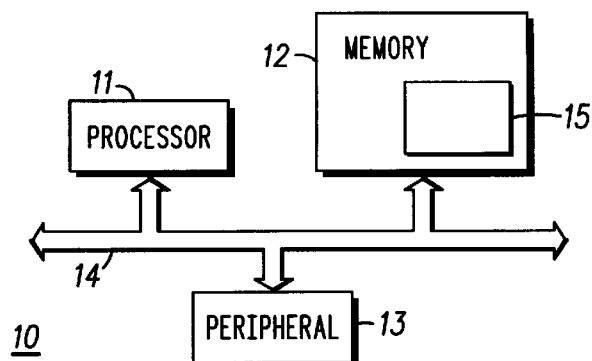
FIG. 1 is a simplified block diagram of a computer system employing the present invention.

FIG. 1 is a simplified block diagram of computer system 10 employing the present invention. Computer system 10 (hereafter 'computer') comprises processor or CPU 11, memory 12 and optional peripheral 13 coupled by bus 14. Peripheral 13 is not essential to the present invention but is illustrated because one or more peripherals are commonly used in connection with computers and it can be that a branching instruction is issued by a peripheral as well as by the CPU or that compression or decompression is performed by a peripheral as well as by the CPU.

Assume that there are F instructions and that each instruction has a length of $G(i)$ bits, where $i=1, 2, \ldots F$ is an index identifying the instruction. Some or all of the F instructions are conveniently divided into H parts. It is an aspect of the present invention to arrange that certain instructions are divided into parts prior to storage and retrieval and how they are arranged in portion 15 of memory 12 in conjunction with pointers that allow the instruction parts to be located and decoded for execution or coded and dispersed for storage.

The size of each instruction and the size of each of the H parts of an instruction can vary. Variations can result from compressing each instruction. The compression is preferably done by using a Hoffman Code compression method. The H parts of an instruction are stored preferably in different locations in a memory bank, so there is a need to have K pointers to locate all H parts of a single instruction. A "pointer" is generally a memory location address where a particular instruction or part of an instruction is to be found or stored. Pointers are denoted as $P(i,t)$ where i is the instruction index and $t=1,2,3 \ldots K$ is the pointer index. As used herein, F, $G(i)$, i, t, H, K are integers.

Figure 2:
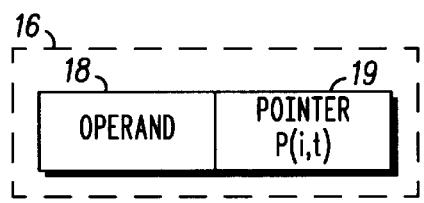
FIG. 2 is a simplified schematic diagram of the content of a branch instruction, according to a preferred embodiment of the invention.
Figure 3:
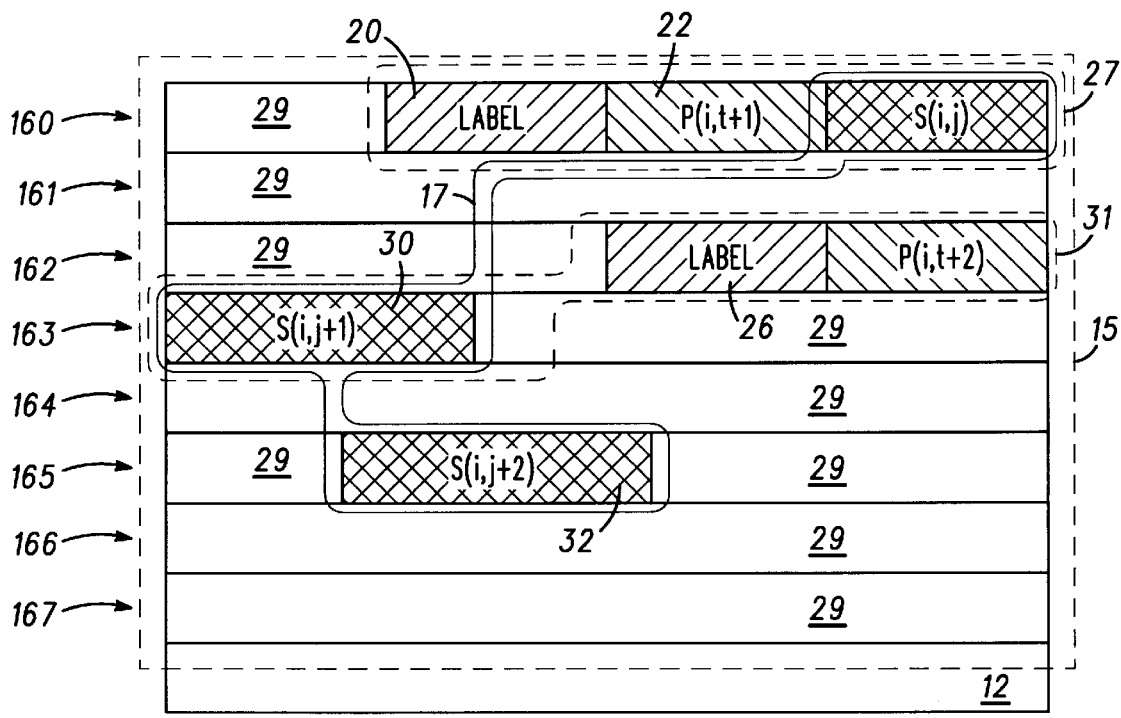
FIG. 3 is a simplified schematic diagram of a portion of a memory bank containing a multi-pointer branch instruction, according to a first embodiment of the invention.

Referring now to FIGS. 1–3, the F instructions are conveniently stored in portion 15 of the memory 12. Portion 15 is also referred to as a memory bank. Portion 15 is conveniently arranged as a matrix of memory fields (e.g., rows and columns). Each row is comprised of a plurality of memory cells which are collectively referred to as a memory word, e.g., rows 160, 161, 162, 163, etc. each form a memory word, but this is not essential.

FIG. 2 is a simplified schematic diagram of the content of branch instruction 16 being accessed (or written) by processor 11 to (or from) memory 12, according to a preferred embodiment of the invention. Associated with branch instruction 16, is a branch target instruction, i.e., the instruction to be executed as a consequence of the branch.

Branch instruction 16 includes operand 18 and L pointers 19, where L is an integer equal or greater than one but less than K. In general, other types of instructions, as for example a branch target instruction or a non-branching instruction do not include pointers combined with the operand in the same manner as for branch instruction 16.

Operand 18 indicates that the CPU has to execute a branch instruction. L pointers 19 point to one or more instruction parts stored in portion 15 of memory 12. In the present invention, this pointer space is used to identify the location(s) of some parts of the branch target instruction to which the branch instruction relates. The remaining K-L pointers are grouped with or within one or more parts of the branch target instruction itself and, conveniently, are associated with an auxiliary label signifying that a pointer follows (or precedes) the label. For convenience of description, the word "pointer", "instruction", "part", and "location" are intended to include their respective plural forms and vice-versa.

F instructions S(i) are stored in memory bank 15 of memory 12. Conveniently, each instruction is divided into H parts 29 where each part is denoted as S(i,j), with i being the instruction index having values i=1 . . . , F, and j being the index of the parts within the single instruction having values j=1 . . . , H. S(i,j), i and j, are integers. H preferably equals four, but other values can also be used. The number K of pointers needed to identify the H parts generally increases as H increases.

It is desirable to store instructions or parts of instructions in a compressed form, where compression is preferably done, for example, according to a Hoffman Code algorithm. Instructions compressed using a Hoffman Code generally have unequal size. Instruction parts compressed by a Hoffman Code contain data concerning their compressed length, so a pointer or other label locating a compressed instruction part only need identify the beginning of each instruction part for the whole compressed instruction part to be identified.

K pointers are needed to point to H parts of a single instruction S(i). The K pointers are individually denoted as P(i,t) where i is the instruction index taking on values i=1 . . . , F, and t is the pointer index taking on values t=1 . . . , K. The variables K, P(i,t) and t are integers, with preferably K=2 when H=4, but other values can also be used. L of the K pointers are part of branch instruction 16 itself (e.g., pointer 19), and are used to point to H(L) parts of the branch target instruction. K-L pointers are stored in a dispersed manner in connection with the remaining H(K-L) parts of the branch target instruction and H(L)+H(K-L)=H.

FIG. 3 is a simplified schematic diagram of portion 15 of memory 12 containing a multi-pointer branch instruction, according to a first embodiment of the invention. Portion 15 contains branch target instruction 17, and a plurality of other instruction parts 29. Memory 12 can be much bigger than memory portion or bank 15. Branch target instruction 17 is pointed to by pointer 19, e.g., by pointer P(i,t) where t can have any convenient value, for instance, t=1.

In the example shown in FIG. 3, branch target instruction S(i) 17 is divided into three parts S(i,j) 24, S(i,j+1) 30 and S(i,j+2) 32, so there is a need for three pointers P(i,t) 19, P(i,t+1) 22 and P(i,t+2) 28. Pointer 19 (e.g., P(i,t)) forms part of branch instruction 16 and the remaining pointers (e.g., P(i,t+1)), P(i,t+2)) are stored in relation to the dispersed parts of branch target instruction 17. Pointers P(i,t+1) 22 and P(i,t+2) 28 are conveniently stored in predetermined locations with respect to instruction parts S(i,j) 24 and S(i,j+1) 30 of branch target instruction 17, conveniently just before S(i,j) 24 and S(i,j+1) 30, respectively. Storing the pointers just before the instruction parts is preferred but other predetermined locations can also be used.

Because branch instruction 16 contains just L pointer 19 and K-L pointers are stored with (or within) the branch target instruction parts S(i), the L pointers can be longer than if all K pointers were stored directly in branch instruction 16. This permits longer pointers and a larger branching space.

As shown in FIG. 3, if branch target instruction 17 is too long to fit into a single word at the location chosen, then it can lap over into later words.

Branch target instruction 17 is desirably stored with label 20 associated with pointer P(i,t+1) and label 26 with pointer P(i,t+2), wherein labels 20,26 indicate that what follows is a pointer for part of branch target instruction S(i). Labels, 20, 26 can be implemented by using one or more specially dedicated bits or by using a special combination of bits (recognizable as a label) that are integrated with the related parts of branch target instruction 17 or as a prefix or suffix to the various parts of branch target instruction 17. Labels 20, 26 are preferably located with or before their associated pointers. While this is convenient, it is not essential and other locations and relationships between labels and associated pointers can be used, provided that they are sufficient to uniquely indicate whether the data associated therewith is a pointer or not. Branch target instruction 17 (and other instructions 29) can be stored in compressed or decompressed form, with compressed form being preferred.

To summarize, computer 10 has branch instruction 16 with pointer 19 (e.g., P(i,j)) to locate first part S(i,j) 24 of branch target instruction 17 within memory bank 15, wherein part 24 has associated therewith label 20 and pointer P(i,j+1) 22 (collectively, group 27). Pointer P(i,j+1) points to next instruction part S(i,j+1) 30 of branch target instruction 17 which has associated therewith label 26 and pointer P(i,j+2) 28 (collectively group 31). P(i,t+2) 28 points to further part S(i,j+2) 32 of instruction 17, and so on (in this example H=3, K=3).

It is desirable that each pointer has a label associated therewith identifying that the bits that follow (or proceed or are located a known distance away) are a pointer. For example, labels 20, 26 indicate that the bits that follow are pointers, e.g., pointers 22, 28, respectively. A label is not needed, in this example, for instruction part S(i,j+2) since it is the last part of instruction S(i,). S(i,j), S(i,j+1), S(i,j+2) are all of the parts of branch target instruction S(i) 17 in the example of FIG. 3.

Figure 4:
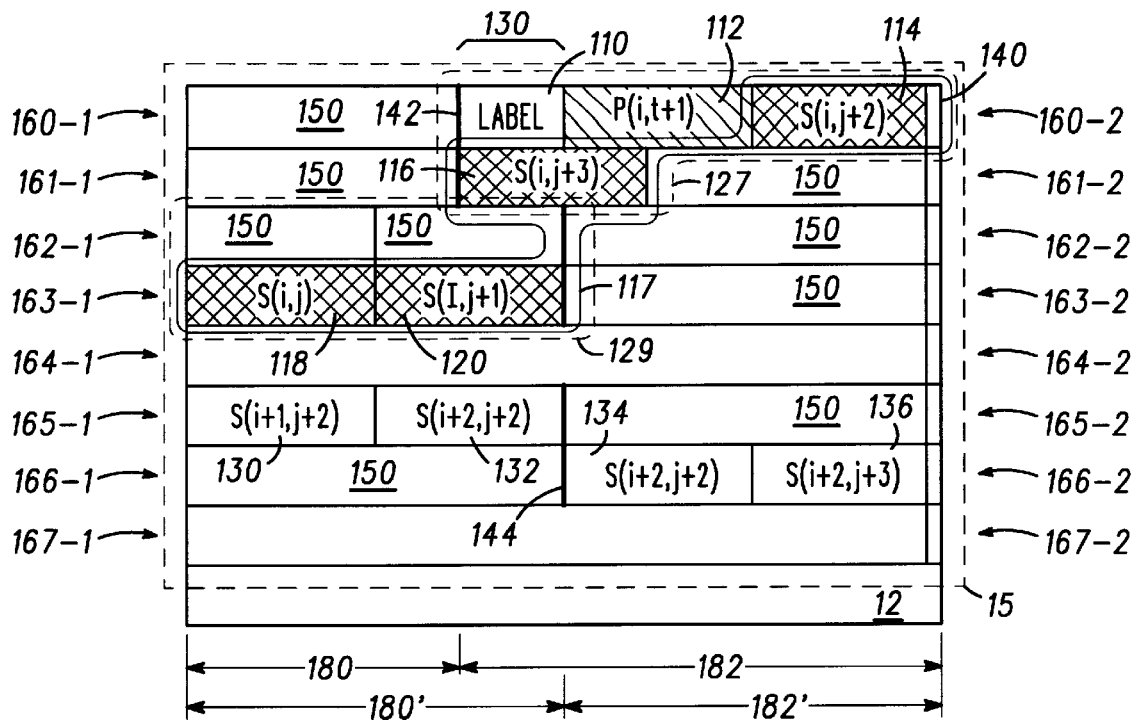
FIG. 4 is a simplified schematic diagram of a portion of a memory bank containing a multi-pointer branch instruction, according to a further embodiment of the invention.

FIG. 4 is a schematic diagram of portion 15 of memory 12 according to a further embodiment of the invention. Portion 15 contains branch target instruction 117 and a plurality of other instruction parts 150. As noted previously, memory 12 can be much bigger than memory portion or bank 15. Branch target instruction 117 is analogous to branch target instruction 17 of FIG. 3.

F instructions are stored in memory bank 15 with each instruction divided into H parts. Each part is denoted as S(i,j), as previously explained. H preferably equals four, but other values can also be used. For example, in FIG. 4, memory portion 15 contains four parts S(i,j) 118, S(i,j+1) 120, S(i,j+2) 114, S(i,j+3) 116 of branch target instruction 117 (collectively S(i)). Some or all parts of instructions S(i) can be stored in a compressed form, as previously explained.

K pointers are needed to point to the H parts of instruction 117. The K pointers are individually denoted as P(i,t), as previously explained. Preferably K=2 for H=4, but other values can also be used, depending on the value of H. In the example of FIG. 4, branch target instruction 117 uses one pointer P(i,t) 19 stored within (or with) branch instruction 16 and one other pointer P(i,t+1) 112 stored with instruction parts S(i). For convenience, pointer P(i,t+1) is associated with instruction part S(i,j+2) 114 and label 110, but this is not obligatory.

Each memory word 160–167 is desirably divided into first portion or "half" 160@1–167@1, followed by second portion or "half" 160@2–167@2 and tag 140. The words "half" and "halves" are not intended to indicate that first portion 160@1–167@1 and second portion 160 @2–167@2 are of equal size but are merely convenient terms of reference. Reference numbers 180, 180' are intended to identify the first half and reference numbers 182, 182' are intended to identify the second half of the various words 160–167. It is assumed that each word 160–167 is the same size, i.e., has the same number of bits. As is subsequently explained the first and second halves of words 160–167 can be of different sizes (e.g., different numbers of bits) for different words, as indicated by the variable length arrows associated with first half reference numbers 180, 180' and second half reference numbers 182, 182'.

It is convenient that each first portion or half 160@1–167@1 end in one of B possible locations (boundaries 130), identified in FIG. 4 by heavy vertical lines 142, 144 separating first portions 160@1–167@1 and second portions 160@2–167@2. Tags 140 are conveniently but not essentially placed in second halves 182, 182. Tags 140 indicate, for example, where first portions 160@1–167@1 end. Boundaries 130 are not needed for words which are empty (e.g., 164, 167), but can be used.

In the example of FIG. 4, the parameter B=2, that is, there are 2possible locations 142, 144 where each word 160, 161, 162, 163, 165, 166 can be separated into first and second portions or halves 180, 180' and 182, 182'. In this situation, only one bit is required for each tag 140. The first halves of the memory words can have two sizes, as shown by the arrows 180,180', and the second halves of the same words can have two sizes as shown by the arrows 182, 182'. Also, since it is assumed that the words are all of the same length, then (for B=2) first half 180 and second half 182' have the same number of bits and first half 180' and second half 182 have the same number of bits, but first half 180 does not have the same number of bits as second half 182, and so forth.

In the preferred embodiment, first V (V=trunc(H/2)) parts (e.g., S(i,j), S(i,j+1) of each multi-part instruction are stored in first half 180, 180', e.g., in word 163@1. The first V parts of a first instruction are stored in consecutive order, followed by the first V parts of the second instruction, both in first half 180, 180'. The remaining H-V parts of the first instruction are stored in second half 182, 182', e.g., in words 160@2–161@2, followed by the H-V parts of the second instruction in second half 182, 182', and so forth. If, for example, instructions S(i) 117 is divided into four parts S(i,j) 118, S(i,j+1) 120, S(i,j+2) 114, S(i,j+3) 116, then first and second parts S(i,j) 118, S(i,j+1) 120 are stored in first half 180', e.g., in part 163@1 of memory word 163, and third and fourth parts S(i,j+2) 114, S(i,j+3) 116 are stored in second half 182', e.g., in parts 160@2–161 @2 of memory words 161–162. It is not necessary that related parts of the same instruction be stored in the first and second halves of the same word. As used herein, the "first instruction" can be any instruction in a sequence of instructions and the "second instruction" is a subsequent instruction.

Storing different parts of each instruction in first and second halves (e.g., 180/180', 182/182') of memory bank 15, as described above, is advantageous in that it allows parallel compressing and decompressing of the instruction parts. That means that the instructions going to or from the first half of the memory bank and the instructions going to or from the second half of the memory bank can be compressed or decompressed in parallel. This shortens the compression/decompression time which is an extremely useful result, especially in communication and other real time applications where very rapid, e.g., real time, instruction processing is needed.

It is an aspect of the preferred embodiment of the present invention that branch target instruction 117 is split and stored in both halves of memory bank 15 of memory 12. Where some part of branch target instruction 117 is long enough to not fit within a left or right half of a memory word, then it can lap over into the next memory word of the same half, as for example, see parts 114, 116 in FIG. 4.

In the example shown in FIG. 4, group 127 comprising branch target instruction parts S(i,j+2), S(i,j+3) is located by pointer P(i,t) 19 contained in branch instruction 16 and group 129 having branch target instruction parts S(i,j), S(i,j+1, is located by pointer P(i,t+1) 112 of group 127. Label 110 of group 127 identifies pointer 112 as a pointer. Label 110 is desirable but optional.

Figure 5:
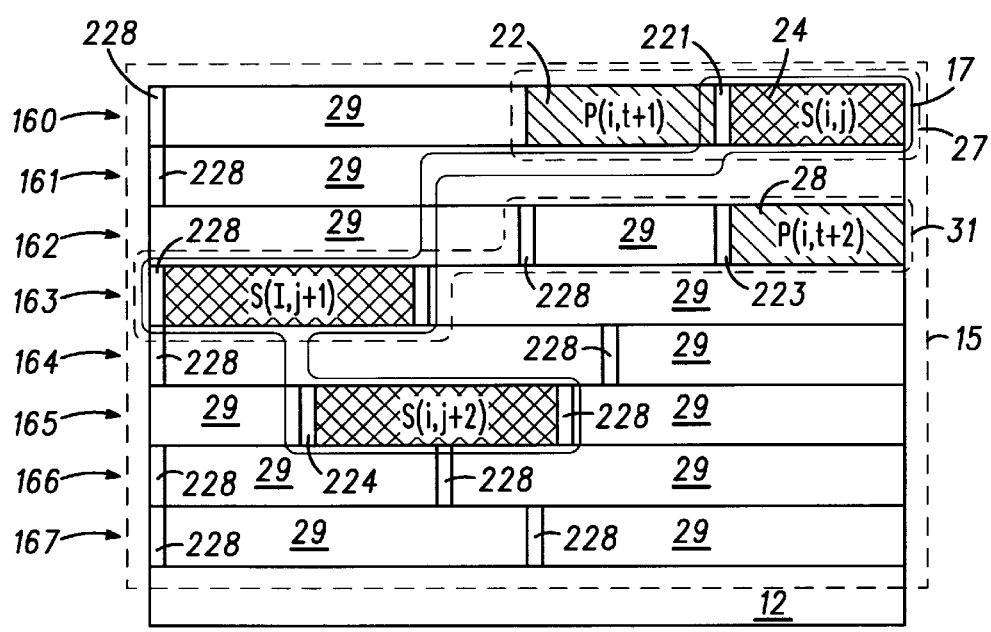
FIG. 5 is a simplified schematic diagram of a portion of a memory bank containing a multi-pointer branch instruction, according to yet a further embodiment of the invention.

FIG. 5 is a schematic diagram of portion 15 of a memory 12 containing multi-pointer branch target instruction 17 in a manner analogous to that shown in FIG. 3 but according to yet a further embodiment of the invention. The embodiment shown in FIG. 5 differs from the embodiment shown in FIG. 3 by having labels 221–228 associated with the H instruction parts 29. Like reference numbers identify like elements. Each instruction part 29 has a label 228 and the S(i) parts of branch target instruction 17 have labels 221–224. These labels indicate whether or not the instruction part is a branch target instruction, whereas in FIG. 3, it is assumed that any instruction part not having label 20 is not a branch target instruction. Labels 228 and 221–224 are implemented by using one or more specially dedicated bits appearing in or with each instruction part 29 and in branch target instruction 17, as described for example in connection with FIG. 3 for label 20.

Figure 6:
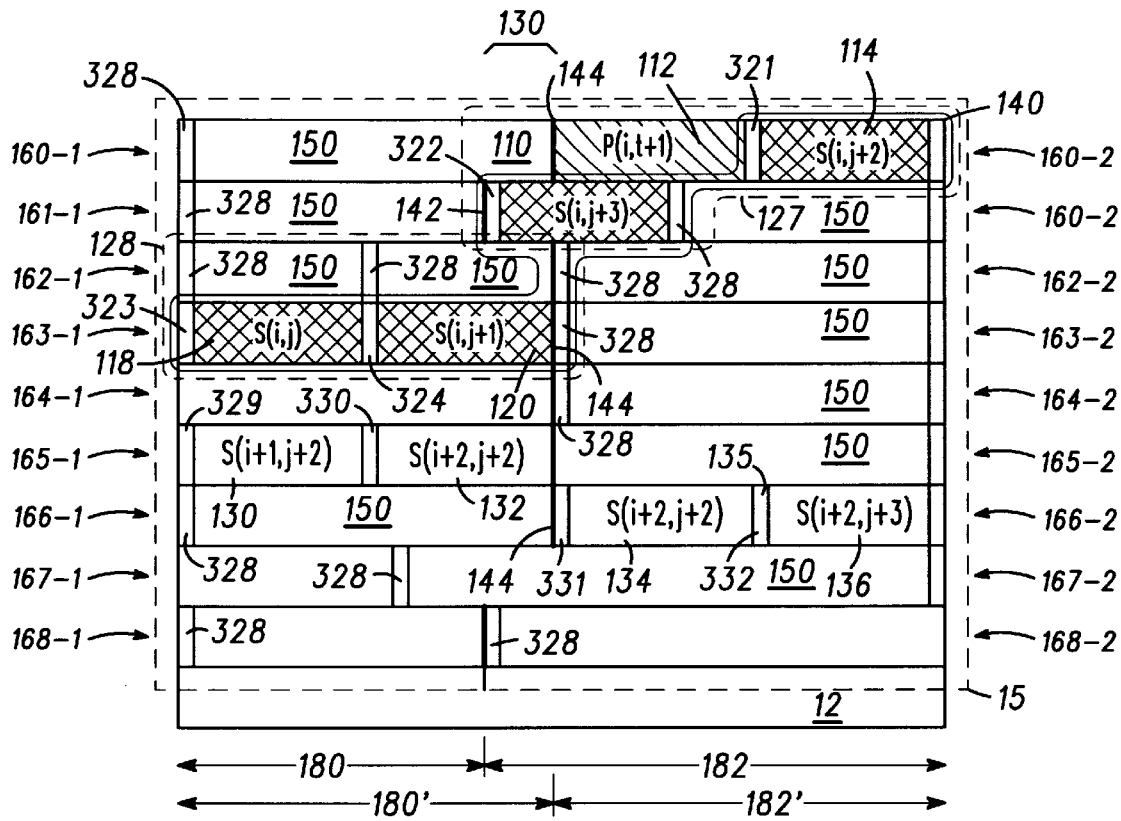
FIG. 6 is a simplified schematic diagram of a portion of a memory bank containing a multi-pointer branch instruction, according to a still further embodiment of the invention.

FIG. 6 is a schematic diagram of a portion 15 of memory 12 containing multi-pointer branch target instruction 117, analogous to that described in FIG. 4 but according to a still further embodiment of the invention. The embodiment shown in FIG. 6 differs from the embodiment shown in FIG. 4 by having labels 328, 321–324, 329–332 Like reference numbers identify like elements. Instruction parts 150 have labels 328, instruction parts 114, 116, 118, 120 have labels 321–324 and instruction parts 130, 132, 134, 136 have labels 329–332 indicating whether or not the instruction parts are for a branch target instruction. Labels 321–323 indicates that parts 114, 116, 118, 120 are parts of branch target instruction 117. It is convenient that the labels, precede, follow or be a part of the instruction parts but this is not essential, since any known relationship will work. In the preferred embodiment, the labels precede the instruction parts and labels 328, 321–324 and 329–332 are implemented by using one or more specially dedicated bits appearing with each instruction part, as has been previously described. In the example of FIG. 6, pointers P(i,t) 19 is included with branch instruction 16 and pointer P(i,t+1) 112 is included with branch target instruction part S(i,j+2) 114.

In FIG. 6, the situation is illustrated where B=2 for words 160–168, that is, the demarcations between first half 180, 180' and second half 182, 182' are limited to only two locations within words 160–168. Those of skill in the art will understand based on the description herein that memory bank 15 can contain many more words than those (e.g., 160–168) illustrated in FIGS. 3–6. When B=2, tag 140 need only be one bit, where a "1" indicates, for example, location 142 and "0" indicates location 144, or vice-versa. In this situation, the value of tag 140 for each word 160–168 indicates the first half length 180, 180' for each word 160–168. However, this is merely for convenience, and tag 140 can represent the beginning of second half 182, 182'or any other desired demarcation value. Also, B need not be limited to a value of two, and other values can be used.

Figure 7:
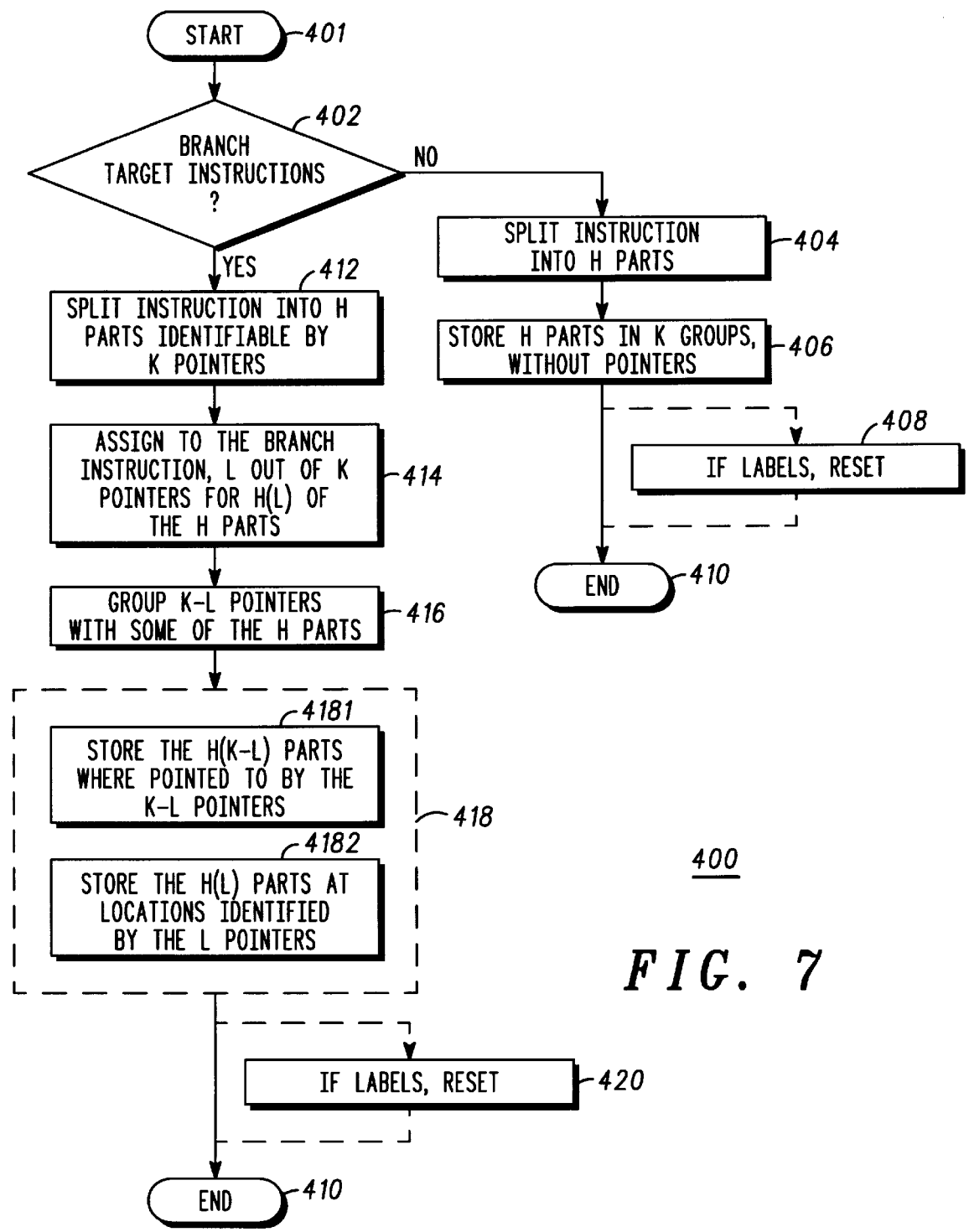
FIG. 7 is a simplified flow chart of a memory organization and computer system operating method, according to a first embodiment of the invention.

FIG. 7 is a simplified flow chart of computer operation method 400, according to a preferred embodiment of the invention. In combination with the FIGS. 2–6, FIGS. 7–9 illustrate how memory bank 15 is conveniently accessed and organized by processor 11. It is assumed for simplicity that an instruction is to be written to memory 12 by processor 11. Method 400 is initiated by start 401.

In query step 402, the instruction is tested to determine whether it is a branch target instruction. If "NO", the instruction is split into H parts in step 404 and in step 406 the H parts are stored in K groups without pointers. Pointers are not needed since the parts are stored sequentially. If labels are present, as shown for example in FIGS. 5–6, then they are reset (or set, as the case may be) in step 408 and the routine terminates at END 410.

If the result of query step 402 is "YES", then the instruction is split into H parts identifiable by K pointers in step 412. In step 414, L out of the K pointers are assigned to related branch instruction 16, i.e., to be pointers 19. Pointers 19 are thus able to point to H(L) of the H parts.

In step 416, the remaining K-L pointers needed to locate the remaining H(K-L) parts are grouped or associated with the H(L) and H(K-L)–H(L) parts. A convenient manner of doing this is illustrated in FIGS. 3–6. For example in FIG. 3, L of the K-L pointers are grouped with the H(L) parts, e.g., pointer 22 in FIG. 3, and the remaining K-2L pointers are grouped with the first H(K-L)–H(L) of the H(K-L) parts, e.g., pointer 28.

In step 418, including substeps 4181 and 4182, the H(L) parts and the H(K-L) parts of the target branch instruction are stored in memory bank 15 in the manner illustrated in FIGS. 3–6. In this way, the H(L) parts of the instruction are stored at locations identified by the L pointers 19 and the H(K-L) parts of the instructions are stored where pointed to by the remaining K-L pointers, which are associated with the H(L) parts and, for example, with the first H(K-L)–H(L) parts of the instruction. Substeps 4181 and 4182 can be performed in either order.

If labels are used, then these are reset (or set) in step 420 and the routine ends at 410.

Figure 8:
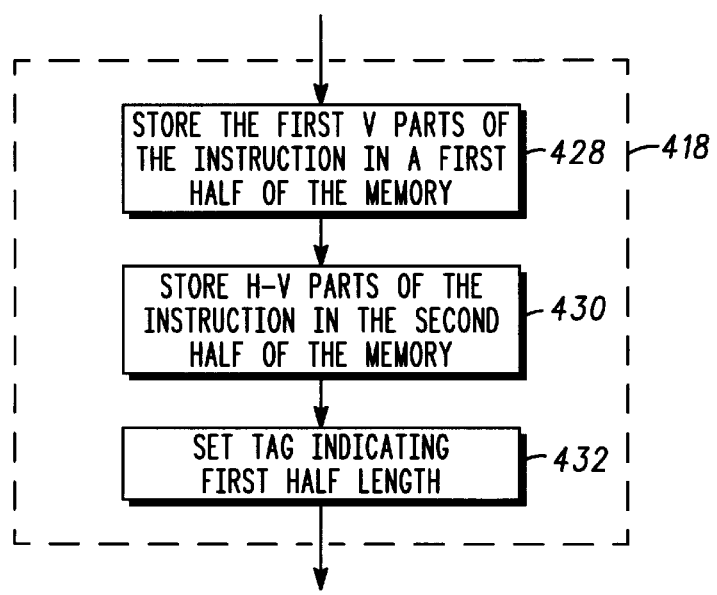
FIG. 8 is a flow chart showing further details of a portion of the flow chart of FIG. 7, according to a further embodiment.

FIG. 8 is a flow chart showing further details of step 418 of the flow chart of FIG. 7, according to a further embodiment of the invention. FIG. 8 corresponds to the FIGS. 4, 6 where the words of memory bank 15 are partitioned into two halves. The flow chart of FIG. 8 applies to both substeps 4181 and 4182.

In step 428, the first V parts of the instruction being stored in step 418 are stored in a first half (e.g., 180, 180') of memory bank 15 and in step 430 the H-V remaining parts of the instruction are stored in the second half 182, 182' of memory bank 15, word by word. Succeeding instructions are split and stored in the same manner so that first V parts of subsequent instructions go in the first half and the H-V parts go in the second half of successive words of memory bank 15. In step 432, tag 140 is set to, conveniently, identify the first half length or other parameter identifying the demarcation between the first and second halves. While the steps of FIG. 8 are shown as being carried out in the order 428, 430, 432, this is not essential and any convenient order can be employed.

Figure 9:
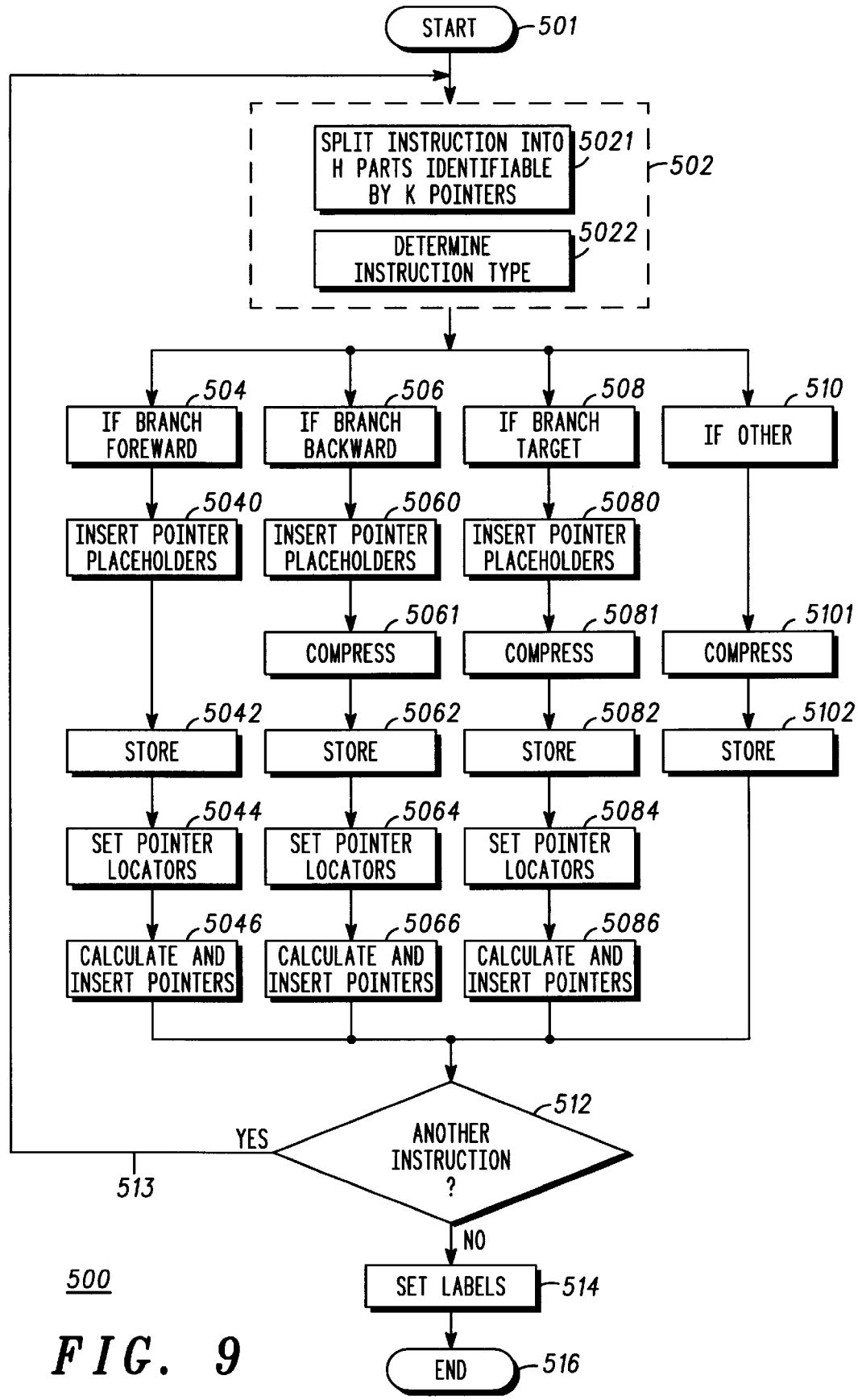
FIG. 9 is a simplified flow chart of a memory organization and computer system operating method, according to a still further embodiment of the invention.

FIG. 9 is a simplified flow chart of memory organization and computer system operating method 500, according to a still further embodiment of the invention. In step 502 comprising substeps 5021, 5022, the instruction is split into H parts identifiable by K pointers and the instruction type determined. Substeps 5021, 5022 can be carried out in either order. The outcomes of substep 5022 are shown at 504–510. "STORE" steps 5042–5102 are consistent with the memory organization illustrate in FIGS. 3–6.

If, as indicated by outcome 504, the instruction is a 'branch forward' instruction, then in 5040 pointer placeholders are inserted, that is, bits are set aside for receiving a pointer value. In step 5042 the instruction parts are stored in memory bank 15 without compression but with space(s) left for the pointers needed to point to the instruction parts, but the actual pointer values are as yet unspecified since they are not yet known. In step 5044, the locations of the empty pointers are placed in a temporary store elsewhere in memory 12. In step 5046, the pointer values are calculated and inserted in the empty pointers using the pointer locators retrieved from the temporary store. The pointer values can be calculated because the locations of the instruction parts are now known from store operation 5042.

If, as indicated by outcome 506, the instruction is a 'branch backward' instruction, then in step 5060 pointer placeholders are inserted, that is, bits are set aside for receiving a pointer value. In step 5061, the instruction parts are compressed. In step 5062, the compressed instruction parts are stored in memory bank 15 with space(s) left for the pointers needed to point to the instruction parts, but the actual pointer values unspecified since they are not yet known. In step 5064, the locations of the empty pointers are placed in a temporary store elsewhere in memory 12. In step 5066, the pointer values are calculated and inserted in the empty pointers using the pointer locators retrieved from the temporary store. The pointer values can be calculated because the locations of the instruction parts are now known from store operation 5062.

If, as indicated by outcome 508, the instruction is a 'branch target' instruction, then in step 5080 pointer placeholders are inserted, that is, bits are set aside for receiving a pointer value. In step 5081, the instruction parts are compressed. In step 5082, the compressed instruction parts are stored in memory bank 15 with space(s) left for the pointers needed to point to the instruction parts, but the actual pointer values unspecified since they are not yet known. In the case of a branch target instruction, it is understood that L pointers are stored with the associated branch instruction (e.g., in outcomes 504, 506) and K-L pointers with the instruction parts. Under these circumstances it is only necessary to leave a single pointer space with each branch target instruction part that is to receive a pointer, since the other pointers are stored with the associated branch instruction.

In step 5084, the locations of the empty pointers are placed in a temporary store elsewhere in memory 12. In step 5086, the pointer values are calculated and inserted in the empty pointers using the pointer locators retrieved from the temporary store. The pointer values can be calculated because the locations of the instruction parts are now known from store operation 5082.

If, as indicated by outcome 510, the instruction is an instruction type not previously described, then in step 5101, the instruction parts are compressed. In step 5102, the compressed instruction parts are stored in memory bank 15 without pointers.

Query step 512 tests whether there is another instruction to be processed according to steps 502–510, and if "YES" the method loops back as indicated by arrow 513 to step 502 and repeats until a "NO" outcome is obtained from query step 512. Any associated labels are set in step 514 and the routine reaches "END" 516.

As those of skill in the art will understand based on the description herein, the steps illustrated in FIG. 8 can also apply to the STORE operations shown in FIG. 9.

An advantage of the present invention is that it provides for multiple pointers (e.g., K) to point to the H parts of, for example, a branch target instruction, while still allowing a relatively big branching space. This is because, advantage is taken of the available pointer space in the associated branch instruction to store L of the K pointers needed to locate for the branch target instruction parts and storing the remaining K-L pointers with the H parts of the branch target instruction. Thus, the branch instruction and branch target instruction can be read and processed in a few, or even a single, clock cycle.

Dividing the instructions into H parts and storing them respectively in first or second halves of memory bank 15 in the manner described, allows parallel coding and decoding of the instructions, thereby speeding processing of the instructions. This is a result ofd great practical significance for real time operations such as are often encountered in communication systems.

While the present invention has been described in terms of dividing the memory bank into two halves (i.e., portions), the halves need not be equal in size and a larger number of partitions can also be used. Accordingly, the words "half" and "halves" are intended to include more than 2 partitions. Further, while it is convenient to use H=4 and K=2 and and B=2, other choices can be made for these parameters without departing from the invention in its most general sense. It will be understood by those skilled in the art that various changes in form and detail may be made without departing from the invention embodied in the claims that follow.

What is claimed is:

1. A computer system comprising a memory that stores a branch instruction and an associated branch target instruction, wherein each branch target instruction is divided into H parts identified by K pointers, wherein H(L) of the H parts correspond to L of the K pointers and H(K-L) of the H parts correspond to K-L of the K pointers, and the L pointers are with the branch instruction and point to the location of the H(L) parts and the K-L pointers are dispersed in association with the H(L) parts and some of the H(K-L) parts in the memory.

2. The computer system of claim 1 wherein H(L)+H(K-L)=H and all H parts of the branch target instruction are locatable using the L pointers to locate the H(L) parts and the K-L pointers to locate the H(K-L) parts of the instruction in the memory.

3. The computer system of claim 1, wherein a label is associated with at least one of the H(L) parts, the label identifying a pointer pointing to at least one of the H(K-L) parts.

4. The computer system of claim 1, wherein the memory portion is made up of memory words and each memory word includes a first half, a second half and a tag for identifying a demarcation between the first and second halves.

5. The computer system of claim 4 wherein a first V (V=trunc(H/2)) parts of each instruction are stored in first halves of the memory words and H-V parts are stored in second halves of the memory words.

6. The computer system of claim 5 wherein the first V parts of a first instruction are stored in consecutive order in first halves of successive memory words, followed by first V parts of a next instruction.

7. A method of operating a computer having memory and using a branch target instruction of H parts identified by K pointers, accessed by a related branch instruction, comprising:

assigning L out of the K pointers for H(L) of the H parts and K-L pointers for H(K-L) of the H parts;

associating the L pointers with the branch instruction and the K-L pointers with some of the H parts of the branch target instruction;

storing H(L) parts of the branch target instruction at locations identified by the L pointers associated with the branch instruction; and storing H(K-L) parts of the branch target instructions at locations identified by the K-L pointers associated with the some of the H parts of the branch target instruction.

8. The method of claim 7, wherein at least one of the storing steps further comprises, splitting a first instruction into V parts wherein V=trunc(H/2) and H-V parts, and storing the V parts in a first half of the memory and storing the H-V parts in a second half of the memory.

9. The method of claim 8 wherein the V parts occupy the first halves of one or more words and the H-V parts occupy second halves of one or more words.

10. The method of claim 7 wherein the assigning, associating and storing steps comprise, storing the H parts with reserved but empty pointer fields associated with the H parts so as to be able to determine locations where the H parts are located in memory, calculating the pointer values for the H parts corresponding to the locations of the H parts and then storing these pointer values in the reserved pointer fields.

* * * * *